United States Patent
Pfeffer et al.

(10) Patent No.: US 7,970,388 B2
(45) Date of Patent: Jun. 28, 2011

(54) METHODS AND APPARATUS FOR PROVIDING MULTIPLE COMMUNICATIONS SERVICES WITH UNIFIED PARENTAL NOTIFICATION AND/OR CONTROL FEATURES

(75) Inventors: Howard Pfeffer, Reston, VA (US); Matthew Cannon, Sterling, VA (US)

(73) Assignee: Time Warner Cable Inc., Stamford, CT (US)

( * ) Notice: Subject to any disclaimer, the term of this patent is extended or adjusted under 35 U.S.C. 154(b) by 270 days.

(21) Appl. No.: 12/060,855

(22) Filed: Apr. 1, 2008

(65) Prior Publication Data

US 2008/0246605 A1    Oct. 9, 2008

Related U.S. Application Data

(60) Provisional application No. 60/909,479, filed on Apr. 1, 2007.

(51) Int. Cl.
*H04M 3/42*    (2006.01)
(52) U.S. Cl. ............ 455/414.1; 340/539.11; 379/210.02
(58) Field of Classification Search .............. 455/414.1, 455/417; 379/210.02, 211.01; 340/573.1, 340/539.11; 726/21, 26–28; 725/25
See application file for complete search history.

(56) References Cited

U.S. PATENT DOCUMENTS

| | | | |
|---|---|---|---|
| 6,445,783 B1* | 9/2002 | Creswell et al. | 379/207.13 |
| 6,459,780 B1 | 10/2002 | Wurster et al. | |
| 2005/0096009 A1* | 5/2005 | Ackley | 455/414.1 |
| 2006/0293057 A1* | 12/2006 | Mazerski et al. | 455/445 |
| 2008/0046930 A1* | 2/2008 | Smith et al. | 725/46 |
| 2008/0172746 A1* | 7/2008 | Lotter et al. | 726/26 |

\* cited by examiner

*Primary Examiner* — Thomas Mullen
(74) *Attorney, Agent, or Firm* — Straub & Polotylo; Michael P. Straub; Ronald Straub

(57) ABSTRACT

Methods and apparatus for supporting real time parental screening of a variety of different types of communications which may be directed to or sent from children are described. The methods and apparatus may be used with voice, text messaging and/or E-mail communications individually or as part of a unified parental control system. Parents can set restrictions preventing text messages, E-mails and/or voice calls being sent to or received from particular individuals, sources or destinations. In addition, parents can configure the system to support real time parental screening of individual communications, e.g., messages or calls, with the parent being provided a real time notification of an incoming or outgoing communication and the parent being provided an opportunity to control in real time the disposition of the individual communication. Disposition options may include blocking an outgoing or incoming call, video communication such as point to point video, text message, or E-mail, or sending the communication to a storage device, e.g., voice mail system.

20 Claims, 12 Drawing Sheets

1102

| PARENTAL (SUPERVISOR) LOG | | | | |
|---|---|---|---|---|

MONITORED PARTY-CHILD 1

| DATE | COMMUNICATION TYPE | STATUS | STORED COMMUNICATION | SOURCE |
|---|---|---|---|---|
| 9/1/06 | E-MAIL | DELETED | E-MAIL 1 | BADJOHN@AOL.COM |
| 9/2/06 | E-MAIL | RETAINED | E-MAIL 2 | MIKE@AOL.COM |
| 9/2/06 | VOICE MESSAGE | RETAINED | VOICE FILE 1 | 732-542-9070 |
| 9/3/07 | SMS | RETAINED | SMS 1 | 732-542-9070 |
| 9/3/07 | E-MAIL | DELETED | E-MAIL 3 | BADJOHN@AOL.COM |

MONITORED PARTY-CHILD 2

| — | — | — | — | — |
|---|---|---|---|---|
| — | — | — | — | — |
| — | — | — | — | — |

| CHILD 1 E-MAIL LOG | | | |
|---|---|---|---|
| DATE | COMMUNICATION TYPE | STORED COMMUNICATION | SOURCE |
| 9/2/06 | E-MAIL | E-MAIL 2 | MIKE@AOL.COM |

FIG. 11B

METHODS AND APPARATUS FOR PROVIDING MULTIPLE COMMUNICATIONS SERVICES WITH UNIFIED PARENTAL NOTIFICATION AND/OR CONTROL FEATURES

RELATED APPLICATIONS

The present application claims the benefit of U.S. Provisional Patent Application Ser. No. 60/909,479, filed Apr. 1, 2007 which is hereby expressly incorporated by reference.

FIELD OF THE INVENTION

The present invention relates to methods and apparatus for supporting parental controls and/or notifications and, more particularly, to methods and apparatus for supporting parental notification and/or controls with regard to communications services, e.g., telephone calls, text messages, E-mails, etc. and/or content delivery services.

BACKGROUND OF THE INVENTION

It is becoming relatively common for children to have cell phones and/or text messaging devices in addition to other communications services such as E-mail.

In recent times, a great deal of concern has been expressed with regard to a parent's ability to monitor and/or control a child's access and use of communications services.

In the case of Internet access, filtering programs which a parent can use to block a child's access to content and/or websites which the parent deems to be inappropriate for the child have grown in popularity and have found some success. While such programs are useful in the case of controlling Internet access and a child's exposure to Internet content, a child may still be vulnerable to exposure to individuals and/or information which a parent may deem inappropriate through a cell phone, E-mail or other messaging device. For example, pedophiles and/or other undesirable individuals may try to strike up conversations with children via cell phones and/or text messages, without a parent's knowledge, after obtaining a child's contact information through other means.

While one option to controlling a child's use of a cell phone would be for the parent to limit the child from using the cell phone when the parent is not present, such use restrictions are not practical since a parent can not be reasonably expected to be with a child at all times a cell phone might be used.

In order to give a parent greater control over a child's communications with others, and the contacting of a child by someone outside the family, it would be desirable if methods and apparatus could be developed which would notify a parent when a child is contacted by, or attempts to contact someone outside the family using a cell phone, text message, and/or E-mail. While a parent may be concerned with calls and/or text messages to/from some individuals but not others, it would be desirable if the parent could be able to set some conditions on when the parent would be notified regarding a child's communications. In addition, it would be desirable if a parent could block a child's incoming and/or outgoing communications on a selective basis or redirect particular communications as the parent sees fit. From a parent's perspective, it would be highly desirable if the parent could control/supervise a child's communications though a single interface without having to contact multiple service providers and/or use different communications devices to set parental controls on the various communications services which may be provided to a child.

SUMMARY OF THE INVENTION

The present invention is directed to methods and apparatus for supporting parental notifications and/or controls with respect to one or more communications services, e.g., phone service, text messaging service, E-mail service, etc. The methods and apparatus of the invention can be used with calls placed from or directed to, cell phones, VoIP phones, and/or conventional land line phones. Thus, the parental notification and/or control methods and apparatus of the invention are well suited for use with voice, data, and/or multimedia communications services for fixed and/or mobile devices.

In accordance with the present invention, a parent can set parental control features on a wide range of communications services which are provided to a child. The services may include, e.g., voice, data and/or multi-media services including for example, telephone service, E-mail, text messaging and/or other services. Various parental control settings are provided for VoIP, conventional telephone service (POTS), SMS, MMS, etc. In accordance with the invention, a parent configures parental control settings through a centralized service which stores the parent's parental control settings for each of the various types of services being provided to the parent's child. Options include blocking outgoing calls/messages to particular destinations which may be identified by IP addresses, telephone numbers and/or one or more other destination identifiers. Options also include blocking incoming calls/messages from particular sources which may be identified by IP addresses, telephone numbers and/or one or more other source identifiers.

Rather than simply block an incoming call or message, the parent may choose to redirect one or more messages to voice mail or another message storage device rather than allow it to go directly to the child identified as the destination of the communication.

Thus, parental configured automated screening of communications is supported in some embodiments. Such features can be used alone or in combination with parental notification and/or dynamic parental screening features which are also supported in various embodiments.

With respect to parental notification, a parent may be provided the option of being notified of all or selected communications to/from a child. In some embodiments, a call or message to a child's communications device triggers a communication notification to the parent and the parent is provided the opportunity to monitor the communication and/or control the disposition of the communication. For example, with respect to incoming calls, the parent may determine from caller ID information who the calling party is and then select to allow the call to complete to the child's phone, send the call to voice mail or to terminate the call, e.g., without the call being completed to the child's phone. Similar options may be implemented with regard to the disposition of SMS or other messages which a parent is notified of prior to the message being provided to the child to which it is directed.

With respect to outgoing communications from a child's communication device, the parent may configure the communications settings so that the parent is notified of some or all outgoing communications and is provided the opportunity to monitor and/or block such outgoing communications.

By providing a parent the opportunity to set parental controls on multiple communications services at a single location, a parent's task of maintaining and/or updating parental control settings for multiple communications services is simplified and the likelihood that a parent will take advantage of and use such services is increased particularly where a child is being supplied with multiple communications options and services.

From a service provider's perspective, the unified parental control and notification options made possible by the present invention provide the service provider a greater opportunity to sell a bundle of services intended for an entire family as opposed to one of a variety of communications services which might otherwise be provided by a variety of different service providers.

Various additional features and advantages of the present invention are discussed in the detailed description which follows.

BRIEF DESCRIPTION OF THE DRAWINGS

FIGS. 11a-11b illustrate various parental supervisor and child communications logs which may be created in accordance with the present invention.

DETAILED DESCRIPTION

As discussed above, the present invention is directed to methods and apparatus for supporting parental notification and/or controls with regard to communications services, e.g., telephone calls, text messages, E-mails, etc. and/or content delivery services.

Figure 1:
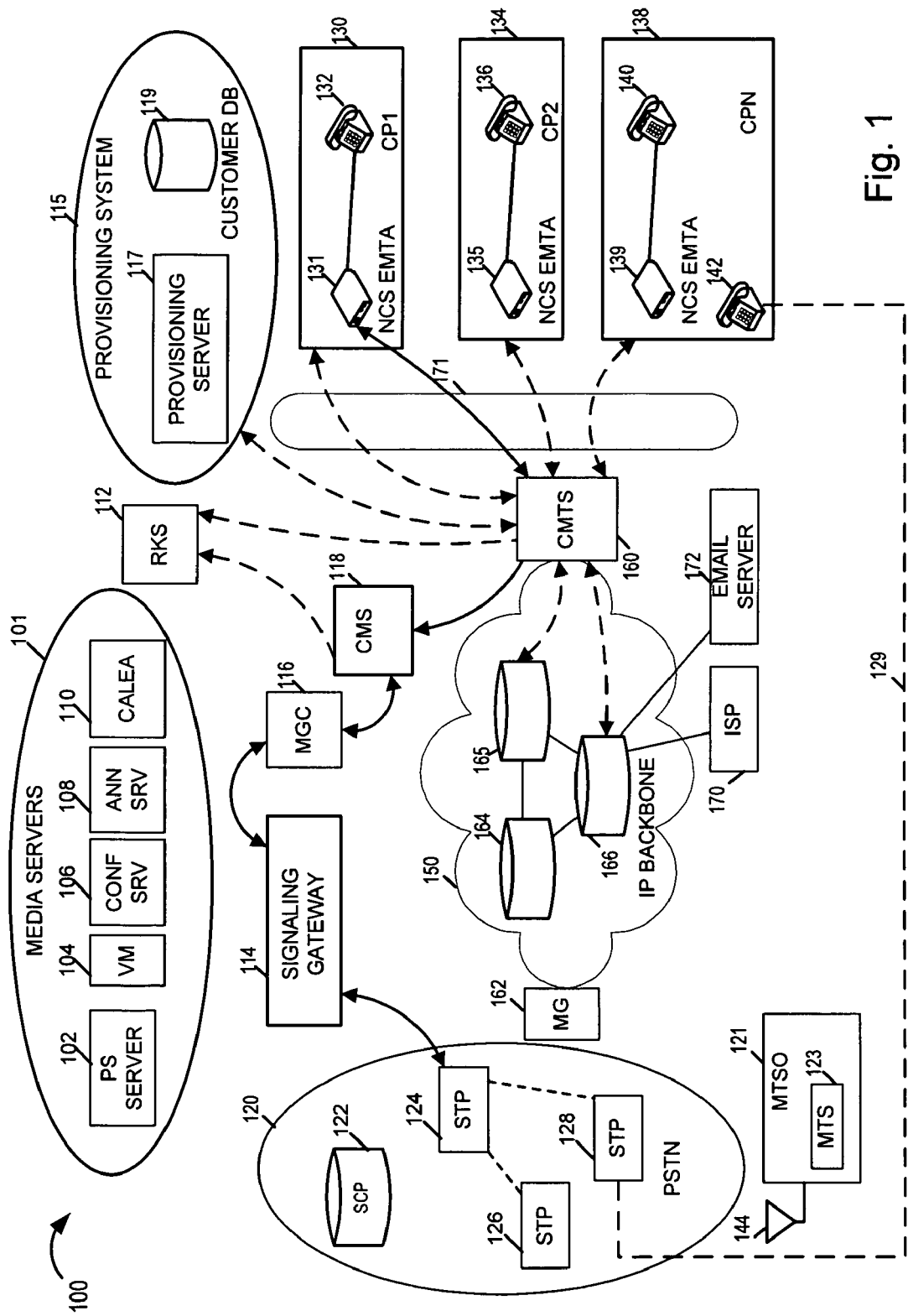
FIG. 1 illustrates an exemplary communications system implemented in accordance with the invention that is capable of providing a wide range of communications services under parental control and/or supervision.

FIG. 1 illustrates an exemplary communications system 100 implemented in accordance with the invention that is capable of providing a wide range of communications and/or information services under parental control and/or supervision. The system 100 allows a parent or other supervisor to set constraints on different types of communications, information services and/or content services restricting access to such services with regard to particular content and/or restricting communications to and/or from particular sources and/or destinations. The supervisor, e.g., parent, may also set the system 100 to detect and notify the parent of particular communications and allow the parent to provide disposition information, e.g., a real time disposition selection allowing the parent to specify how to handle the particular incoming and/or outgoing communication. Disposition options may vary depending on the type of communication involved, e.g., call dispositions options may include blocking an incoming or outgoing call or sending the call to voice mail or having the parent answer an incoming call while E-mail dispositions may include similar blocking or storage options as well as an E-mail log option where copies of E-mails to a supervised individual may be stored or logged for future review.

The various components of the system 100 will now be discussed. The system 100 includes a public switched telephone network (PSTN) 120, a mobile telephone switching office 121, a signaling gateway 114, a media gateway 162, an IP backbone 150, a plurality of media servers 101, a media gateway controller 116, a Call Management System (CMS) 118, an Internet Service provider (ISP) 170, an E-mail server 172, a Cable Modem Termination System (CMTS) 160, a provisioning system 115, a record keeping server 112 and a plurality of customer premises 130, 134, 138 coupled together as shown in FIG. 1.

The PSTN 120 may be implemented as part of the conventional telephone network commonly used to place and receive conventional telephone calls. In the illustrated embodiment, the PSTN 120 is implemented as an intelligent network. The PSTN 120 includes a service control point (SCP) 122, which is coupled to a signal transfer point 124. The STP 124, which may be implemented as a telephone switch, is coupled to one or more STPS 126, 128. The STPs provide call routing capability and can detect various conditions in response to one or more AIN triggers being set at the STP. When an AIN trigger is activated, the STP contacts the SCP 122 for call processing instructions with regard to the call which activated the AIN trigger. The PSTN 120 may include or interact with one or more mobile telephone switch offices 121 each of which normally includes at least one mobile telephone switch 123. Via the MTSO 121, calls may be placed to cell phones, e.g., cell phone 144 shown at customer premise 138. In addition, text messages may be communicated to the cell phone 144 or from the cell phone 144 to another cell phone or user device in the system 100.

The STP's 124, 126, 128 support both voice and control signaling. The STP 124 may exchange control signals with the SCP 122 but may also interact via the control signaling path that exists between the STP 124 and signaling gateway 114. The signaling gateway 114 allows the STP which uses SS7 signaling to interact with the media gateway controller 116 which provides various control functions with respect to IP communications. Thus, the signaling gateway 114 serves, among other things, as a control signal format converter converting between various signaling formats supported in the network 100. The media gateway controller 116, serves to provide signaling and various control functions to the media gateways such as the CMTS 160 and media gateway 162.

The CMS 118 is a call management system which provides call control within the network and supports such functions such as call setup and tear down. The CMS 118 may interact with the PSTN 120 via the MGC 116 and signaling gateway 114 in the case of calls originating and/or terminating in the PSTN 120 but which involve a IP based party on the other end, e.g., an IP telephony based subscriber located at one of customer premises 130, 134, 138. The IP backbone 150 includes a plurality of routers 164, 165, 166 for routing IP packets between the various devices and system elements coupled to the IP backbone. The IP packets can communicate data, e.g., voice, text messages, E-mails, video, etc and/or control information. Thus, the IP backbone can be used to support a wide type of communications as well as media delivery, e.g., in packetized form. The IP backbone 150 thus serves as a communication bridge between the PSTN 120, ISP 170 and a cable network which includes the CMTS 160 and various cable termination devices 131, 135, 139 included at individual customer premises 130, 134, 138. The CMTS 160 is a Cable Modem Termination System which provides access to/from the various devices coupled to the CMTS by a cable network. The cable network includes a plurality of cable lines extending between the CMTS 160 and NCS EMTA's 131, 135, 139 located at the individual customer premises. The NCS EMTAs 131, 135, 139 are residential gateway devices. The MTAs, included in each of the NCS EMTAs 131, 135, 139, are embedded Media Terminal Adapters that are included in cable modems which are coupled to the end user devices, e.g., IP telephones 132, 136, 140. While shown as embedded devices, the media terminal adapters MTAs may be implemented as standalone devices which work with cable modems as opposed to being embedded in a cable modem. Thus, depending on the embodiment, the MTA may be implemented as a stand alone device or embedded with the cable modem. In the stand alone case, the MTA has a local network interface such as an Ethernet interface, in addition to a cable modem interface, and serves to bridge the local network to the cable network via a cable modem to which the MTA is coupled. In the case where the MTA is embedded as shown in FIG. 1, the MTA is implemented as a software and/or hardware component co-located with a cable modem, e.g., sharing system resources and/or interacting with the cable modem subsystem through a software interface. Thus, each of the NCS EMTAs 131, 135, 139 represents a combination of a cable modem and MTA. In some embodiments a cable modem and MTA, corresponding to an NCS EMTA are implemented as separate devices.

The MTAs implement media manipulation such as, sampling, encoding/decoding, encapsulation which may include encryption and/or framing, decapsulation, and which also support various call signaling protocols which can be used to set up and terminate sessions including VOIP calls.

While the CMTS 160 serves as the interface between the cable system that includes the various connections to the NCS EMTAs 131, 135, 139 and the IP backbone 150, it also interacts with the CMS (Call Management System) 118 with respect to establishing, terminating and routing calls, e.g., over the IP backbone, cable network and/or PSTN 120.

In some embodiments, multiple functions shown as being supported by different devices in the FIG. 1 system are combined into a single device. For example, in some embodiments a signaling gateway 114, media gateway controller 116 and call management system 118 are combined into a single device which may be implemented as a soft switch. Such a device is sometimes called a Call Agent (CA) which can be used to handle the establishment, processing and teardown of telephone calls. In some embodiments the CA is implemented on the same platform as a feature server which provides POTS interaction, Centrex, Tandem and AIN processing for service features normally performed using the SCP 122 and/or other elements of the PSTN 120.

While individual customer premises 130, 134, 138 are shown as including a cable modem/termination device in the form of a NCS EMTA 131, 135, 139, coupled to a telephone 132, 136, 140, the customer premises may include additional devices. For example customer premise 138 is shown as including an additional telephone 142, for direct interaction with the PSTN via, e.g., a plain old telephone line 129. The customer premise also includes a mobile telephone 144 for interacting with the mobile telephone switch 123 at the MTSO 121. The mobile telephone 144 may move with the customer and therefore need not be kept at the customer premise 138. In addition to the telephone devices, the customer premises may include a cable set top box and television for displaying television and/or other content delivered over the cable lines 171.

The provisioning system 115 includes a provisioning server 117 and a customer database 119. The provisioning system 115 is used to store customer information, e.g., information on the set of services to be provided to a customer and some or all of the information that may be needed to configure the various devices in the systems to provide the customer services. The information may be loaded at the time a customer signs up for a service and/or subsequently when the customer updates call screening and/or other information relating to a service. The customer database 119 may include a subscriber record for each customer listing the services to be provided, user settings and other service information. As will be discussed below, the user setting and/or information stored in the customer database 119 may include communications screening/notification information and settings provided by a customer used to manage and supervise a wide variety of media and/or communications services including E-mail, voice calls, text messages, television channel access, etc. The information in the customer database 119 may be loaded into one or more of the devices, e.g., servers in the set of media servers 101, CMTS 160, CMS 118, etc. in the system 100 responsible for screening and/or providing various types of communication and/or media delivery services.

In order to implement the various services offered to customers, a wide range of servers 102, 104, 106, 108, 110 are included in the set of servers 101. The Parental Screening (PS) server 102 of the present invention may be used, in combination with various devices, to implement a communications screening service in accordance with the invention. The set of servers 101 also includes a voice mail server 104 for providing voice mail functions, a conference server 106 for supporting conference calls, an announcement server 108 for generating announcements which may be presented to a call as part of another service. The CALEA server 110 is a server which may be used to support wiretapping operations when wiretaps of calls, e.g., VoIP calls, is required by a court issued wiretap. While shown as a separate server coupled to the IP backbone 150, it should be appreciated that the EMAIL server 172 may be implemented as one of the media servers in the set of servers 101. The servers 102, 104, 106, 108, 110 are shown coupled to the CMS 118 and are coupled though the CMS as well as via various other communications links to the IP backbone 150. Thus, the servers in the set of media servers 101 can receive and/or generate packets corresponding to media, e.g., voice signals, in addition to packets corresponding to control signals. Thus, servers in the set of servers 101 can receive voice signals, interact with the calling party, and control call disposition alone or through interaction with the CMS 118 and CMTS 160.

RKS 112 is a record keeping server, which receives and stores information from various media servers 101, CMS 118 and/or CMTS 160. The record keeping server 112 is used for storing transition/session information used for billing purposes.

Figure 2:
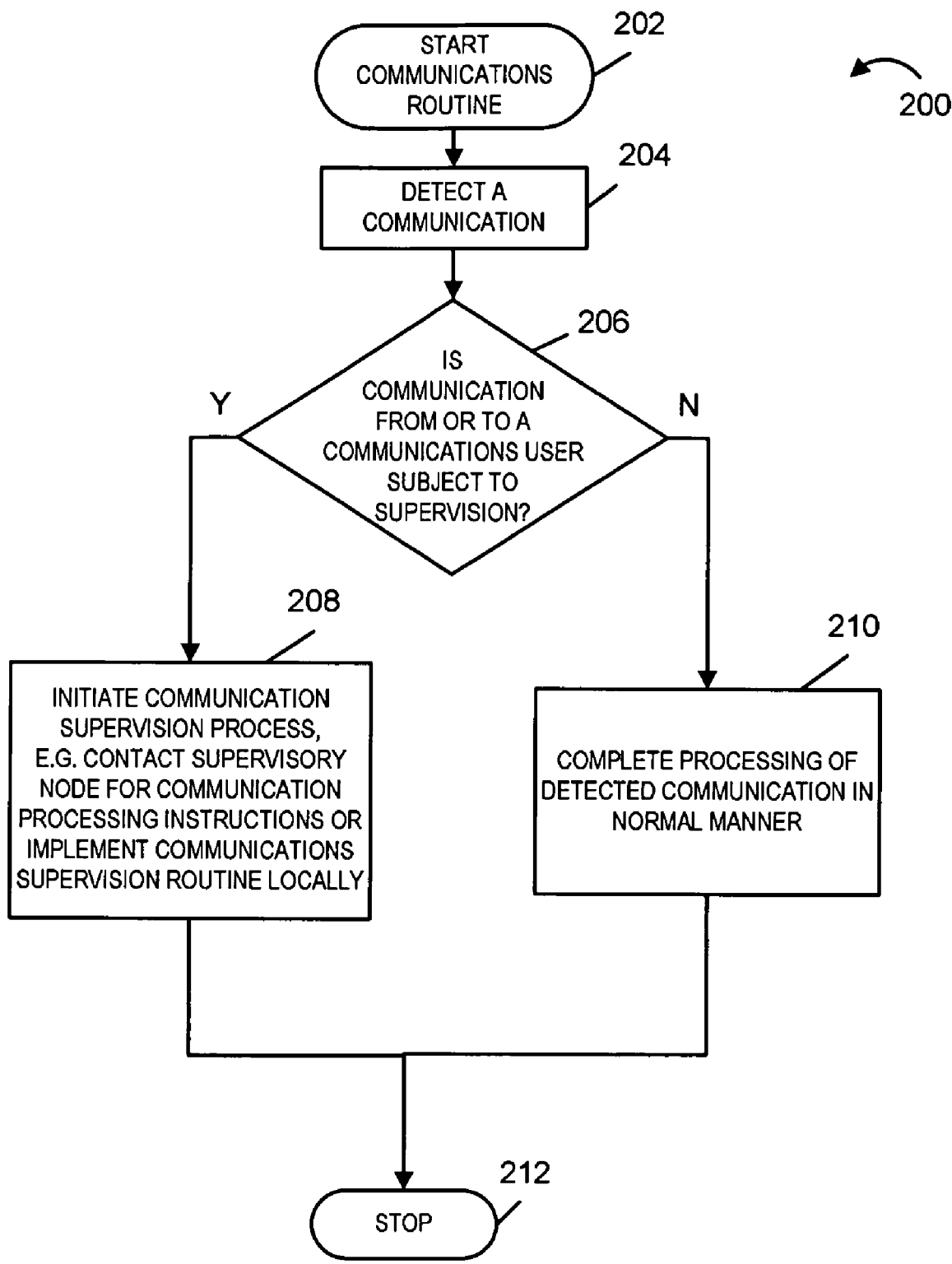
FIG. 2 illustrates the steps of a communication supervision method implemented in accordance with the invention which can be used in the supervision of a variety of different types of communications including text messages, voice calls, video communications, E-mails, etc.

A communications supervision method of the invention, which can be used with respect to a wide range of communications including E-mail, voice calls, text messages, etc. thereby allowing a parent or other supervisor to supervise and/or control the disposition of a wide range of communications to which an individual, e.g., child, may have access to, will now be explained with reference to FIG. 2. FIG. 2 illustrates the steps of a communication supervision method 200 implemented in accordance with the invention. The method may be implemented through the use of one or a combination of elements shown in FIG. 1, e.g., with elements responsible for handling the forwarding of various communications providing communication detection capabilities and with the parental screening server 102 controlling ultimate disposition of the detected communication under control of a set of disposition settings or real time disposition indicated by a supervisor notified of a detected communication. Operation of the method 200 starts in step 202, wherein elements in the network 100 are active and are configured to detect communications subject to supervision. In the case of E-mails, for example, E-mail server 172 may monitor for E-mails to/from a user who is subject to supervision based on the source and/or destination address in each E-mail processed by the server. The mobile telephone switch 123 in the MTSO 121 may monitor to detect calls to/from a mobile telephone user subject to supervision. Similarly, the CMS 118 may be set to monitor for IP based calls to/from a IP telephony user subject to supervision. For purposes of explanation, we will assume that communications corresponding to a supervised child who will be referred to hereinafter as "the supervised user" are subject to supervision by a supervisor, e.g., parent. However, it should be appreciated that a parent/child relationship is not important to the functioning of the invention.

In step 204, a communication is detected by one of the devices in network 100 configured to monitor for communications. Next, in step 206, a determination is made as to whether the communication is from or to a user subject to supervision. This may be done in the device which detects the communication by comparing a source and/or destination identifier to a list of source and/or destination identifiers of users subject to supervision. Alternatively, step 206 may be done in the supervision server 102 after the server is notified of a detected communication and provided with source and/or destination information. It should be appreciated that in various embodiments the screening server 102 checks if a communication is subject to supervision for some types of communications while the routing or forwarding device performs this check without contacting the screening server 102 in other cases, e.g., where the forwarding device has sufficient processing capability and information to make the determination and/or the delay in contacting the security server 102 would result in an unsatisfactory routing or communication delay.

If in step 206 it is determined that a detected communication is not from a user subject to supervision, operation proceeds from step 206 to step 210, wherein processing, e.g., forwarding and/or termination of the communication, is allowed to proceed in a normal unsupervised manner. However, if in step 206 it is determined that a communication is from or to a communication user subject to supervision, operation proceeds to step 208. In step 208, the device, e.g., E-mail server 172, router 165, gateway 162, CMS 118 or mobile telephone switch 123, etc., initiates a communication supervision process, e.g., by contacting supervisory node for communication processing instructions or by the device implementing a communication process locally. After initiation of the supervision process, the supervision process determines how the communication is handled with the method 200 stopping in step 212 after either step 208 or step 210 has determined how the communication is to be handled.

While FIG. 2 shows the overall method of the invention, the supervision process which is initiated in step 208 in accordance with the invention will be discussed further now with respect to FIG. 3 which shows the steps of an exemplary communication method implemented as an exemplary routine 300. The routine 300 is often implemented in the supervisory server 102 but can be implemented locally in a routing, communication forwarding, or communication control device, e.g., at which a communication may be detected.

The communication supervision routine 300 starts in step 302 with the routine waiting for input, e.g., a message or information 304, providing information on a communication corresponding to a supervised user. The communication information 304 is received in step 308 wherein the routine 300 receives as its input information indicating a communication source identifier, destination identifier and/or communication type identifier. In the case of a call or SMS text message, the source identifier may be, e.g., a telephone number corresponding to the calling party while the destination identifier may be, e.g., the telephone number of the called party or party to whom the communication is directed. In the case of an E-mail communication, the source identifier may be the E-mail address of the sender while the destination identifier may be the E-mail address of the addressee to whom the message is being sent.

Operation proceeds from step 308 to step 310 wherein the communication information 304 is used in combination with communications screening information 306 to determine if the communication is from a communication user subject to supervision. The communication screening information 306 may include subscriber records identifying the users subject to screening by their E-mail addresses, telephone numbers and/or other communication source or destination identifiers. The screening information 306 may also include various preset disposition information and/or supervisor notification information indicating how a supervisor is to be notified in the event of communications to a user subject to supervision.

If in step 310 it is determined that the communication is from a communications user subject to supervision, e.g., because the supervised user is indicated as the source of the communication, operation proceeds to step 312. In step 312, communications supervision information, e.g., a communications processing record, corresponding to the source of the communication is accessed. Then in step 314 a determination is made as to whether the accessed information indicated a fixed disposition for handling the communication, e.g., termination (blocking), forwarding, or allowing the communication to be completed in the normal manner. In step 314 if it is determined that the supervision information indicates a set disposition for the detected type of message being sent from the supervised user, operation proceeds to step 320. In step 320, another check is made to determine if the set disposition indicates that the detected communication should be allowed to complete in the normal manner. If in step 320, it is determined that the call should be allowed to be completed in the normal manner, operation proceeds to step 324 where the information corresponding to the target of the communication is considered next.

However, if a set communication disposition indicated a disposition other than allowing the communication to proceed in the normal manner, operation proceeds from step 320 to step 322 wherein communication processing of the detected communication is performed in accordance with the set disposition, e.g., the communication is blocked, e.g., by dropping the communication, storing or forwarding to a destination other than the original destination. The supervised sender may be notified of the disposition as part of step 322 thereby informing the sender that the supervised communication was not being completed as originally intended by the sender.

If in step 314 it was determined that a fixed disposition was not already set for the detected communication in the supervision information, operation proceeds from step 314 to step 316. In step 316 a call is made to an outgoing communication notification and disposition subroutine, e.g., the exemplary routine 400 shown in FIG. 4 which will be discussed further below.

Figure 4:
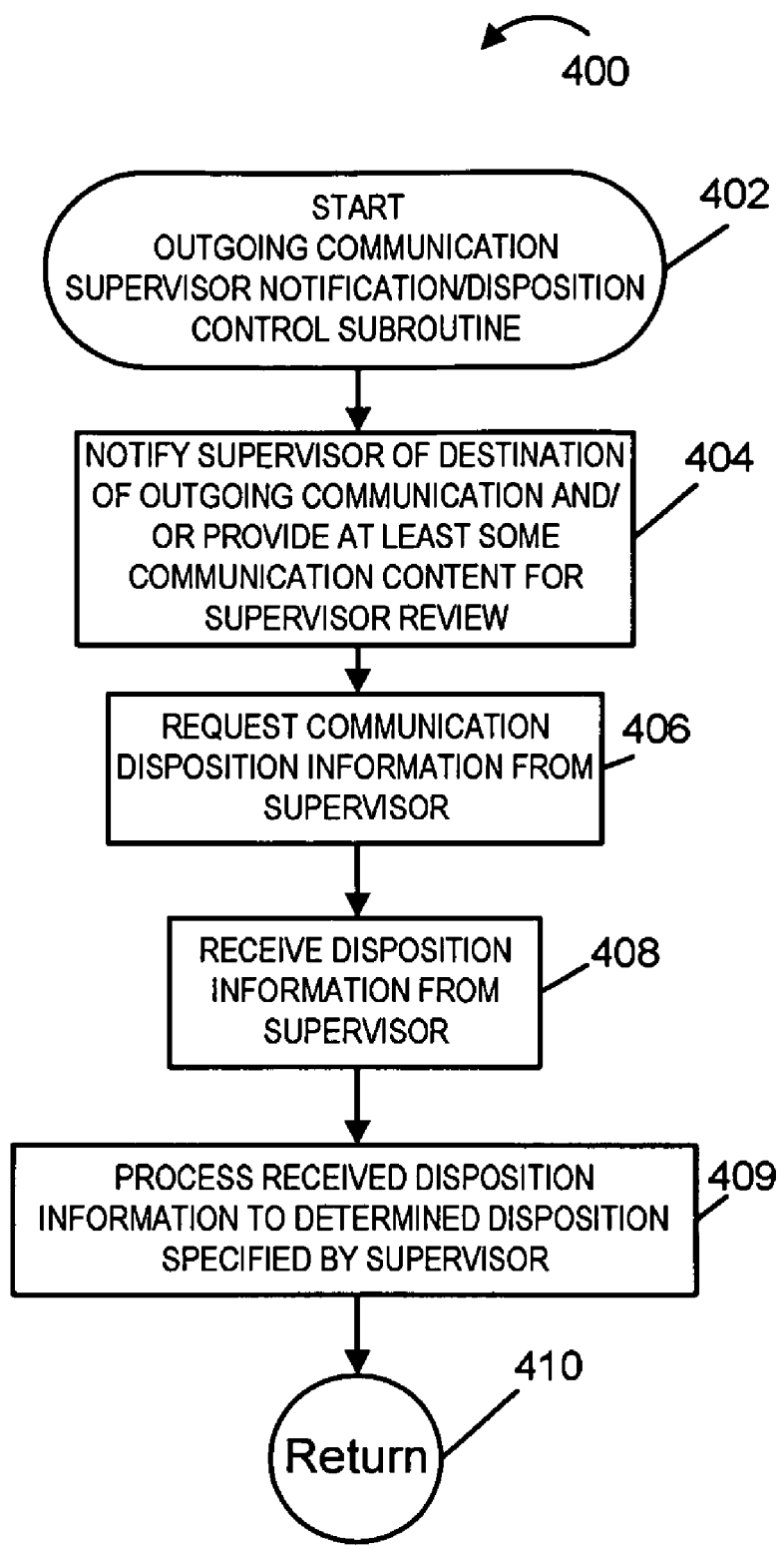
FIG. 4 illustrates an outgoing communication supervisor notification/disposition control subroutine which may be called by the routine of FIG. 3.

Referring now briefly to FIG. 4, the exemplary outgoing communication supervisor notification/disposition control routine 400 starts in step 402, e.g., when it is called by routine 300. Then in step 404, the record corresponding to the supervised source of the communication is accessed and the supervisor contact information is obtained from the information included in the record. The supervisor is notified as part of step 404 of the outgoing communication, sent by the supervised user, which was detected and the communication information and/or content is presented to the supervisor so that an educated decision can be made with regard to how the supervisor wants to dispose of the communication. From step 404 operation proceeds to step 406 in which the supervisor is requested to indicate a desired communication disposition. The disposition options may depend on the type of communication which was detected, e.g., outgoing E-mails may be logged or copied to a supervisor's file while still being allowed to be transmitted to the indicated recipient while outgoing calls may be blocked or allowed to complete to the called party's number.

The notification of the detected call may be sent to the supervisor via an SMS text message, cell phone call or E-mail depending on the setting and/or contact information provided by the supervisor. The disposition instruction may be sent back in the same format in which the notification was received, e.g., by a call, SMS text message or E-mail message. In the case of a call, the supervisor may make a disposition selection by pressing a key on the phone or verbally indicating the selected disposition information. The disposition selection information, e.g., an audio reply, E-mail or SMS text message, is received in step 408. The audio signal, E-mail message or SMS text message is then processed in step 409, e.g., by the device implementing the supervision notification/disposition control subroutine, to determine the supervisor's disposition selection. With the supervisor's indicated disposition having been determined, operation returns in step 410 to the point in the main processing routine at which the call to subroutine 400 was made.

Figures 3, 3A, 3B:
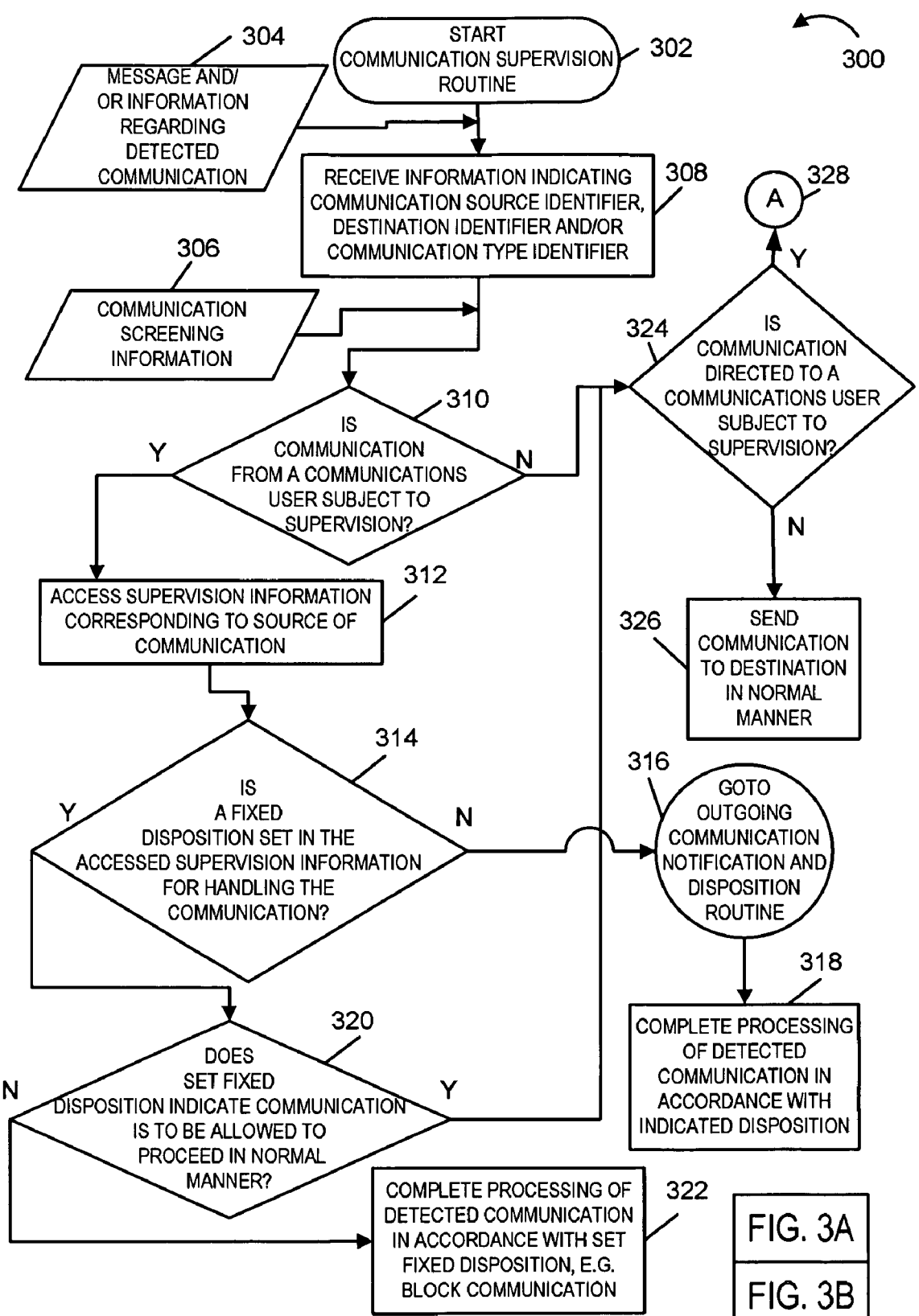
FIG. 3 which comprises the combination of FIGS. 3A and 3B illustrates the steps of an exemplary communication supervision routine which may be called as part of the communications method illustrated in FIG. 2.
Figure 3B:
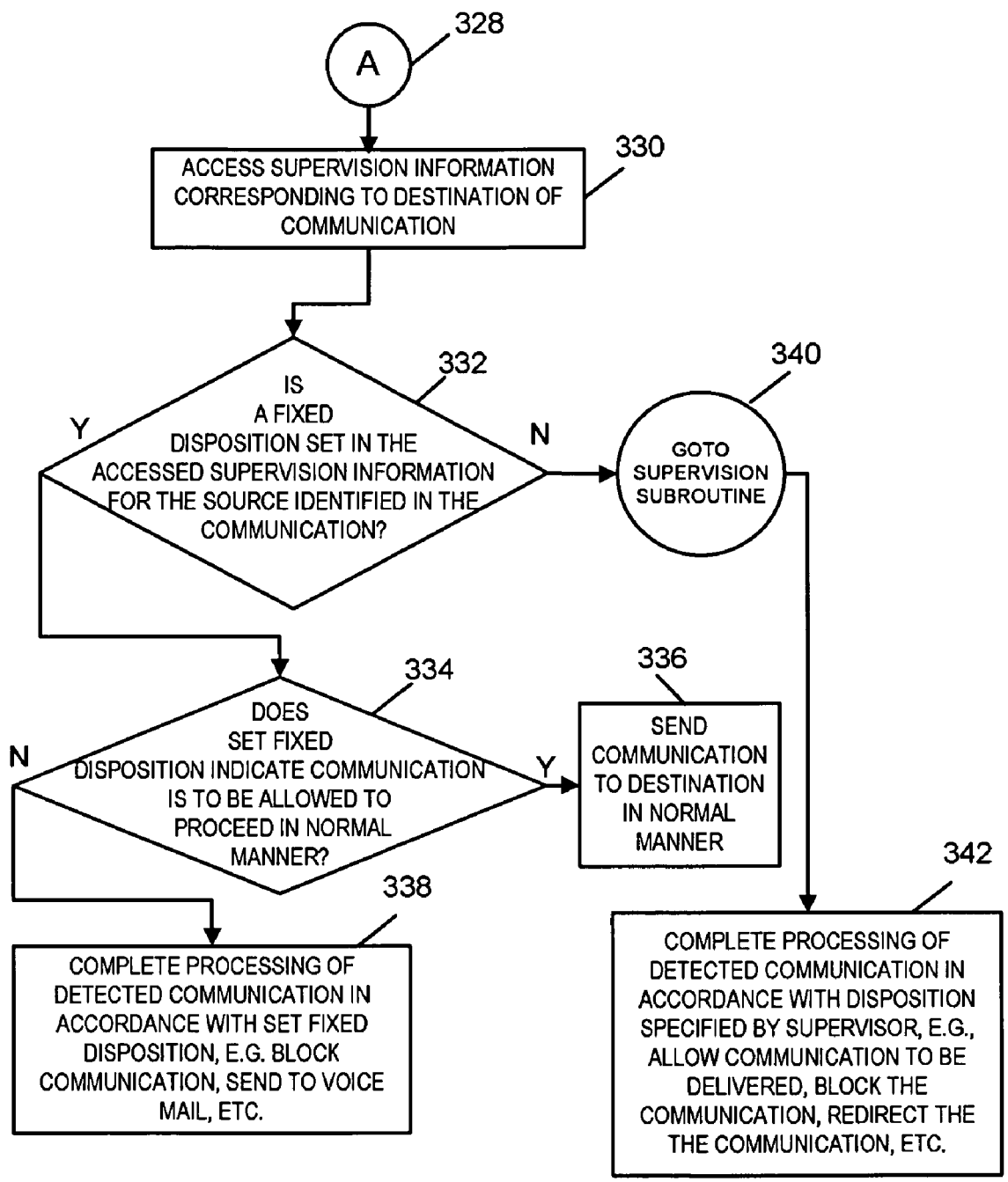

Referring now to FIG. 3, is can be seen that operation proceeds to step 318 upon a return from the subroutine call made in step 316. In step 318 processing of the detected communication is completed in accordance with the disposition selection indicated by the supervisor who was notified, e.g., in real time, of the outgoing communication that was detected.

As discussed, in step 324 which may be entered from either step 310 or step 320, a determination is made as to whether a communication is directed to a communications user subject to supervision. If the detected communication is directed to a communications user who is not subject to supervision, operation proceeds to step 326 in which the communication is sent to the destination in the normal manner and allowed to be completed, e.g., without further supervision. However, if it is determined in step 324 that the detected communication is directed to a communications user subject to supervision operation proceeds to step 330 via connecting node 328.

Thus, it should be appreciated that while steps 312-318 addressed calls from a user subject to supervision, the path starting with connecting node 328 is followed in the case where a detected communication is addressed to a user subject to supervision.

In step 330, supervision information corresponding to the destination of the communication, e.g., the user to which the message, call or other communication is directed is accessed. Then in step 332 a determination is made as to whether a fixed disposition is set in the accessed supervision information for the source identified in the communication. For example, the set of supervision information may indicate that calls from a particular calling party are to be sent to voice mail or blocked while E-mails from a particular source are to be blocked. If a fixed disposition is determined to be set in step 332 for the type of communication and source given the destination to which the communication is directed, operation proceeds to step 334.

In step 334, a determination is made as to whether the set disposition information indicates that the detected communication is to be allowed to proceed in a normal manner, e.g., whether a call is to be allowed to complete to the called party or a message to be delivered to the user to which it is addressed. If in step 334 it is determined that the communication is to be allowed to complete in a normal manner, e.g., without the supervision process altering or preventing the communications delivery or a calls completion, operation proceeds to step 336 wherein the communication is sent or allowed to complete (e.g., as in the case of a call) to the intended destination in the normal manner. However, if in step 334 it is determined that a set disposition indicates that communication should be disposed of in another manner, in step 338 processing of the detected communication will be completed in accordance with the set fixed disposition, e.g., the communication will be blocked, sent to voice mail or some other set action will be taken.

If in step 332 it was determined that a fixed disposition had not been set for the detected communication, a call is made in step 340 to a supervision subroutine in which a supervisor corresponding to the intended recipient of the communication may be contacted for disposition information.

Figure 5:
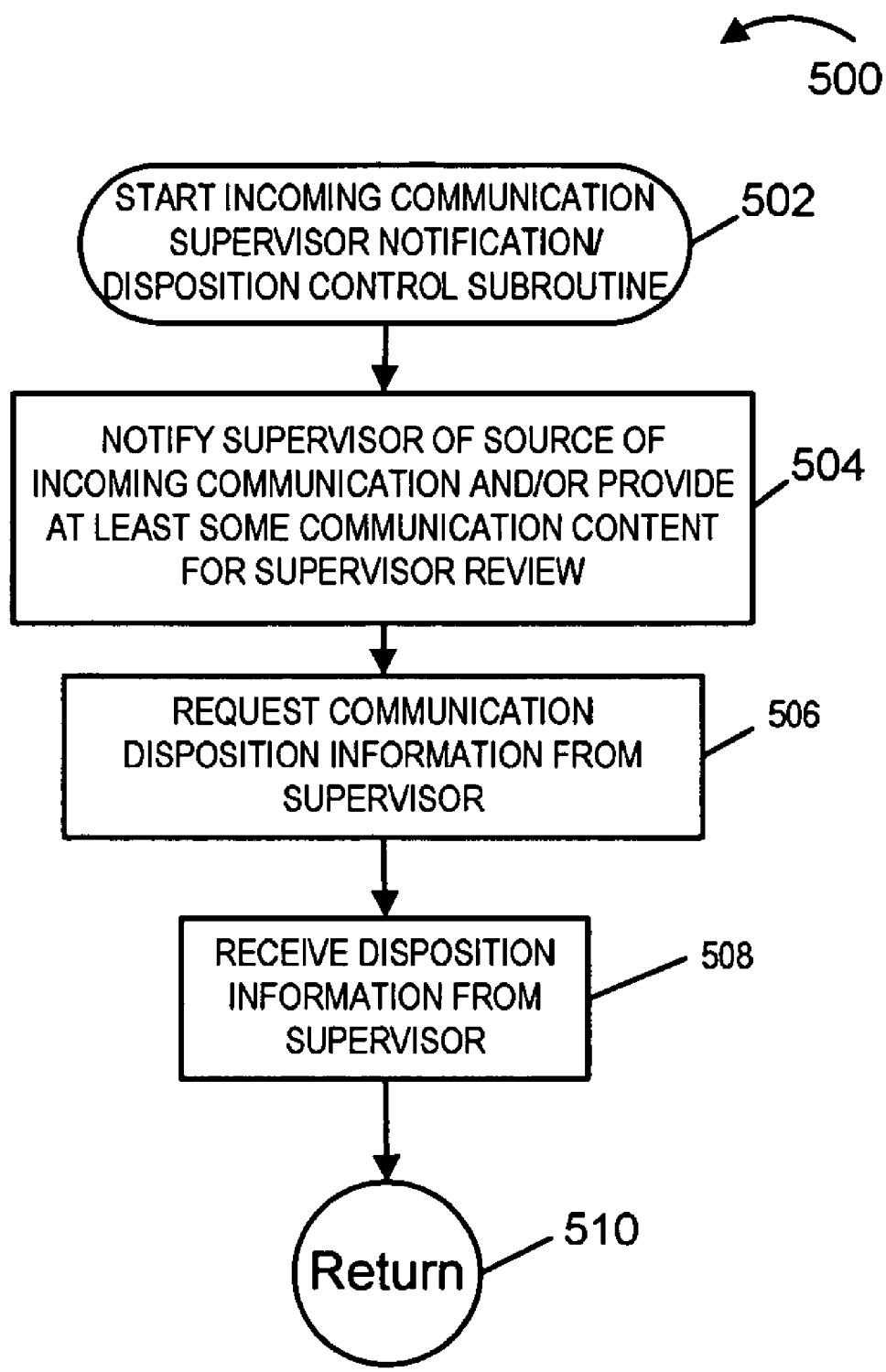
FIG. 5 illustrates an incoming communication supervisor notification/disposition control subroutine which may be called by the routine of FIG. 3.

An exemplary incoming supervisor notification and/or disposition control subroutine for incoming communications which may be called in step 340 is shown in FIG. 5. The routine 500 begins in step 502 when the routine is called, e.g., in response to detection of an incoming communication subject to supervision but for which a fixed disposition has not been set by the supervisor, e.g., parent. In step 504, the supervisor, e.g., parent, of the user to whom the communication is directed is notified of the incoming communication and/or provide at least some communication content which may be reviewed. For example, the supervisor may be contacted using a telephone number or E-mail address which has been set in the supervisory information record corresponding to the identified destination, e.g., called party telephone number or destination E-mail address, of the detected communication. The supervisor may be presented with information about the source of the communication (e.g., the calling party number and/or name or E-mail address of the sender), and the intended destination of the communication (called party number/E-mail name) and/or a portion of the content of the communication, e.g., a copy of the E-mail text or SMS text. The supervisor is then requested in step 506 to respond to the information about the detected communication by specifying a disposition treatment to be implemented for the detected communication, e.g., block incoming communication, send the communication to voice mail, log the E-mail, etc with the possibilities of the disposition selection depending in some cases on the type of communication which was detected.

Then, in step 508, disposition information is received from the supervisor and operation returns via step 510 to the point at which the subroutine 500 was called.

Returning now to the description of the method 300 shown in FIG. 3, it should be appreciated that upon operation returning at the end of step 340 from subroutine 500, operation proceeds to step 342 wherein the disposition option indicated by the supervisor is implemented and communication processing is completed in accordance with the specified disposition option, e.g., the communication may be delivered, blocked, redirected, etc. as specified by the supervisor, e.g., parent.

Is should be appreciated that the steps of the method 300 may be implemented at a single centralized location and/or performed in a distributed manner with different devices in the system 100 implementing different steps of the routine 300.

While the method may be implemented on a wide range of hardware, it involves the use of various sets of supervisor and/or user information. Exemplary sets of control information which may be used by the routine 300 are illustrated in FIGS. 6-9 which will now be described.

Figure 6:
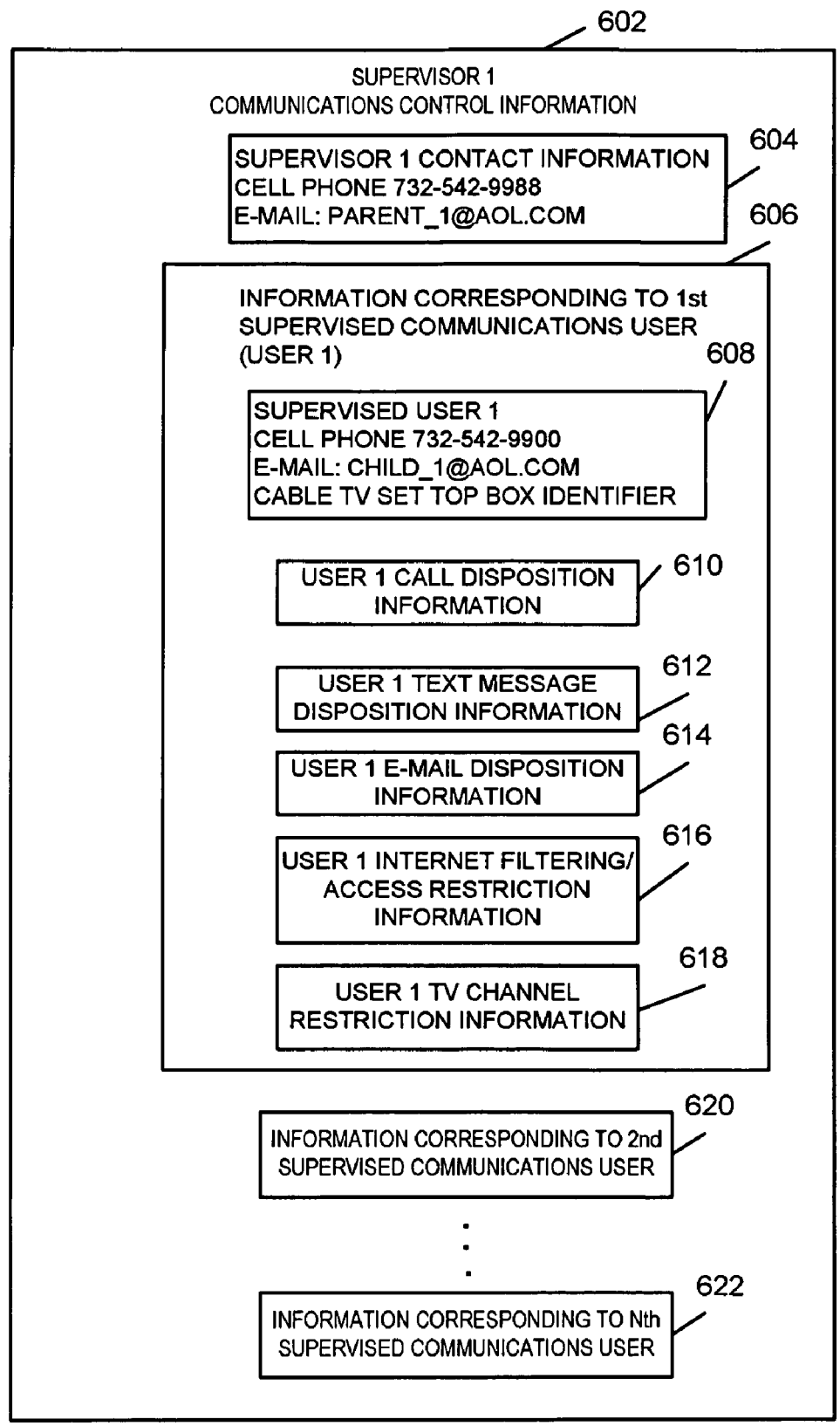
FIG. 6 illustrates a set of supervisor, e.g., parent, control information which may be used to control communication disposition and notification for a plurality of supervised communications users, e.g., children, in accordance with the present invention.

FIG. 6 illustrates a set of supervisor communications control information 602. The set of information may be initially set up during provisioning of a screening service provided to, e.g., parents. During the provisioning process, a system administrator may populate the supervisor's record 602 with the illustrated information, e.g., with the information being obtained from the customer at the time the subscriber signs up for the service. The set of information 602 is stored in the customer database 119 but is also loaded into the parental supervision server 102. The information in the record 602 may be updated by the supervisor to change disposition settings, modify the list of users to be supervised, etc. via the Internet after entering a supervisor password, e.g., as part of a security measure. The supervisor password may be selected by the supervisor and stored in the set of supervisor information. The user information and/or list of users subject to supervision may, and in some embodiments is, limited to users for whom the supervisor contracts for the communications service which is to be supervised. For example, a parent who pays for the telephone and/or cable service provided to multiple children is allowed to supervise those services but not the services being provided to other users with which the supervisor is not associated, e.g., as indicated by subscriber records maintained in the customer database 119, record keeping server 112 and/or parental screening server 102.

In contrast to other systems which might allow for limited screening/disposition of communications corresponding to a single media, the set of information 602 may includes, for each user supervised, screening constraints to be used for each of a wide variety of types of media and/or communications. Thus, the information 602 provides a unified set of control information which the supervisor, e.g., parent, can update at a single location to control the full range of communications/media to which a child might be exposed including text messages, telephone calls, television, etc. Thus, a parent need not update multiple databases located at different locations and/or with different providers but is able to supervise the full range of media to which a child may be exposed through a single interface.

As illustrated in FIG. 6, the set of supervisor information 602, corresponds to a first supervisor, e.g., parent, identified as supervisor 1 for purposes of explaining the invention. A record including the same or similar information would normally be maintained for each supervisor subscribing to the supervisory service. The information 602 includes a set 604 of supervisor contact information, e.g., a cell phone number and E-mail address which may be used to notify the supervisor of a detected communication and seek a real time disposition selection from the supervisor. The supervisor may indicate that the phone or E-mail is to be used as the primary contact method. In this example the supervisor has listed the cell phone number first indicating that this is to be used as the primary contact method with the E-mail being used in the event that a cell phone response is not received, e.g., within a predetermined period of time.

In addition to the contact information field 604, the information 602 includes supervisory information corresponding to individual users, e.g., children, subject to supervision. In the example, information set 606 corresponds to a first supervised user, information set 620 corresponds to a second supervised user and 622 corresponds to an Nth supervised user. The supervision information in each of information sets 620, 622 may be similar to that shown with respect to information set 606 correspond to the first user.

The information 606 corresponding to the first supervised communications user includes information identifying the user's contact information, e.g., cell phone telephone number, E-mail address, and cable set top box identifier which may be used to identify communications and/or other media being sent from or delivered to the user in any one of a variety of formats. While not shown, addition telephone numbers, e.g., land line numbers, used by the user may also be identified. For example, a call placed from the user's cell phone number would include the user's telephone number in a calling party field associated with the call while a call to the user would include the user's telephone number in the called party field of the call. Similarly, the user's E-mail address would appear as a source or destination address depending on whether a detected E-mail was sent from or directed to the user.

In addition to the user identification information 608, the set of user information 606 includes disposition information 610 for calls, 612 for text messages, 614 for E-mails. The disposition information can include time based restrictions, e.g., blocking or redirection of the communication during certain points of the day and/or source or destination constraints with communications to/from some parties being subject to disposition different from communications from parties which are not specifically identified. The disposition and handling for each type of communication may be specified separately with the supervisor being contacted for some calls/E-mails and/or not others, e.g., based on the source and/or destination of the communication. This will be explained further with reference to FIGS. 7, 8 and 9.

In addition to screening/disposition information relating to calls, text messages and E-mail messages, the set of supervision information corresponding to user 1 606 also includes internet filtering/access restriction information 616 and user television restriction information 618. Thus, unlike systems which simple deal with telephone calls, the supervisor, e.g., parent, can set filtering/access restraints in the set of information 606 to be used to control access to media such as the Internet as well as TV. Thus, the system provides comprehensive screening/parental control for multiple communications methods. The supervisor may set the internet filtering information 616 to block particular web sites, web sites dealing with particular topics, e.g., sex, or web sites which correspond to particular domains or geographic regions. Similarly, the supervisor may set the TV restriction information 618 so that adult content channels are blocked, violent content is blocked and/or other types of programs will be blocked either based on their channel number or program information indicative of program content.

Figure 7:
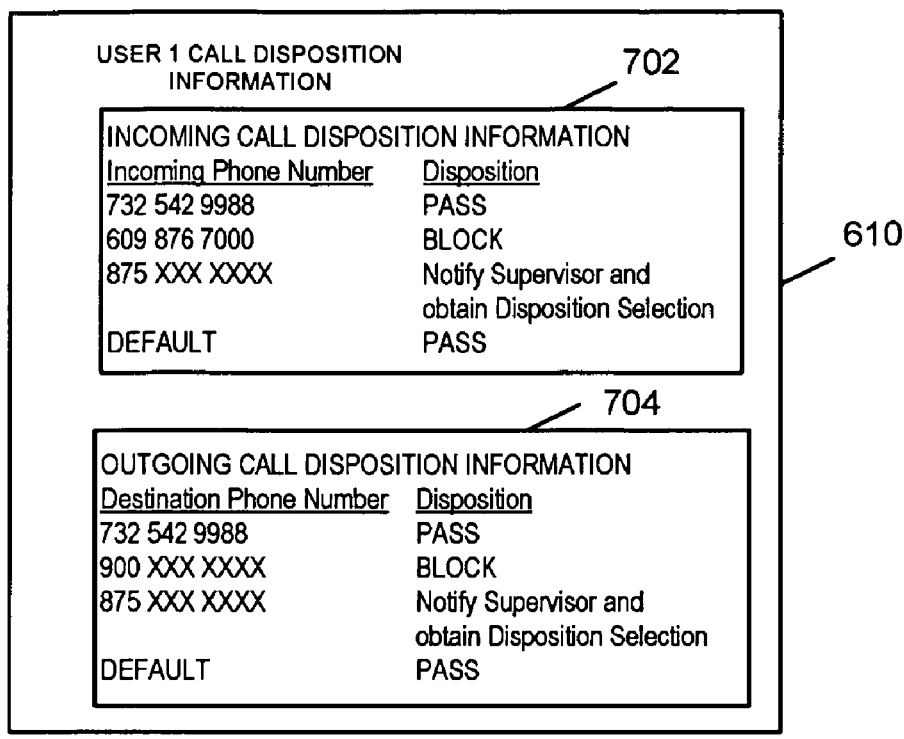
FIG. 7 illustrates a set of call disposition information which may be included in the set of supervisor information shown in FIG. 6.

An example of a set of user call disposition information 610 which may be set up for a supervisor and included in the set of supervisory information 602 is shown in FIG. 7. The set of call disposition information 610 includes incoming call disposition information 702 and outgoing call disposition information 704. The incoming call disposition information indicates the disposition action to be taken for a particular incoming telephone number or set of numbers. For example calls from the first number are to be allowed to pass, e.g., be completed in the normal manner. Calls from the second number are to be blocked while calls coming from telephone numbers starting with 875 are to result in supervisory notification and be handled in accordance with the disposition indicated by the supervisor. For calls not specifically identified, the supervisor can set these to be passed or blocked or some other action taken, e.g., by including a default setting in the set of information 702.

The outgoing call disposition information 704 indicates the disposition action to be taken for a call to a particular outgoing telephone number or set of numbers listed in the set of information. For example calls to the first number are to be allowed to pass, e.g., be completed in the normal manner. Calls to the second number are to be blocked while calls directed to telephone numbers starting with 875 are to result in supervisory notification and be handled in accordance with the disposition indicated by the supervisor. For calls not specifically identified, the supervisor can set these to be passed or blocked or some other action taken, e.g., by including a default setting in the set of information 704.

Figure 8:
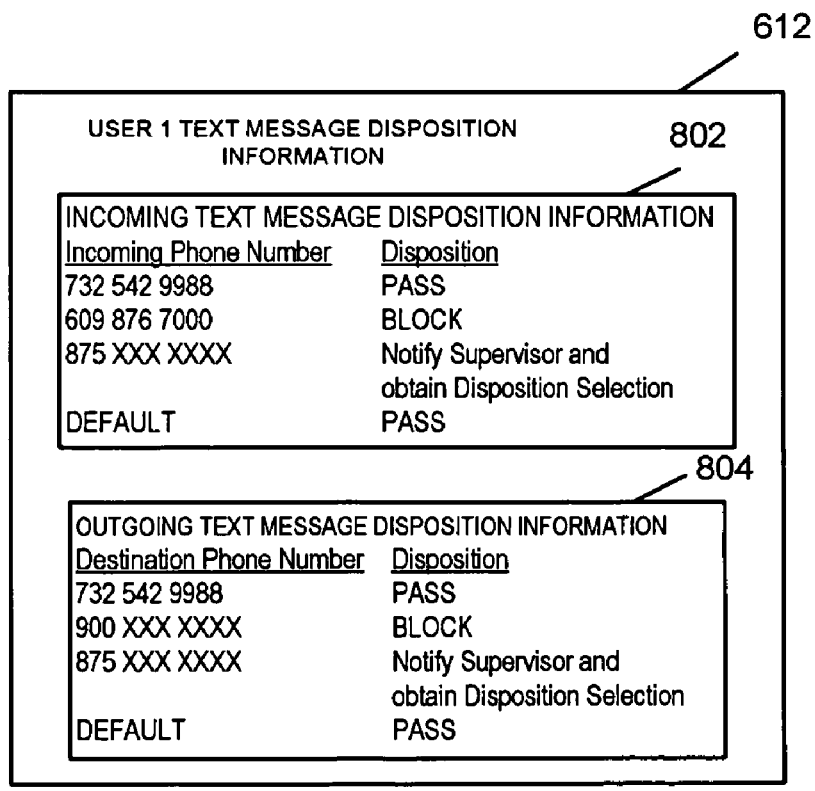
FIG. 8 illustrates a set of text message disposition information which may be included in the set of supervisor information shown in FIG. 6.

An example of a set of text message disposition information 612 which may be set up for a supervisor and included in the set of supervisory information 602 is shown in FIG. 8. The set of text message disposition information 612 includes incoming message disposition information 802 and outgoing message disposition information 804. The incoming message disposition information indicates the disposition action to be taken for message from a sending sender identified, e.g., by a sender telephone number or set of numbers. For example messages from the first number are to be allowed to pass, e.g., be completed in the normal manner. Messages from the second number are to be blocked while messages coming from telephone numbers starting with 875 are to result in supervisory notification and be handled in accordance with the disposition indicated by the supervisor. For messages not specifically identified, the supervisor can set these to be passed or blocked or some other action taken, e.g., by including a default setting in the set of information 802. In the FIG. 8 example, the default for incoming text messages is to allow them to pass. Note that disposition settings for text messages may be different than disposition settings for calls to/from the same telephone number.

The outgoing message disposition information 804 indicates the disposition action to be taken for an outgoing text message corresponding to a particular outgoing telephone number or set of numbers used as message destination identifiers. For example text messages directed to the first number are to be allowed to pass, e.g., be completed in the normal manner. Messages to the second number are to be blocked while messages directed to telephone numbers starting with 875 are to result in supervisory notification and be handled in accordance with the disposition indicated by the supervisor. For outgoing messages not specifically corresponding to a destination identifier included in the set of numbers listed in the set of information 804, the supervisor can set these to be passed or blocked or some other action taken, e.g., by including a default setting in the set of information 804. In the FIG. 8 example the default is to pass text messages to destination which are not specifically identified in the list 804.

Figure 9:
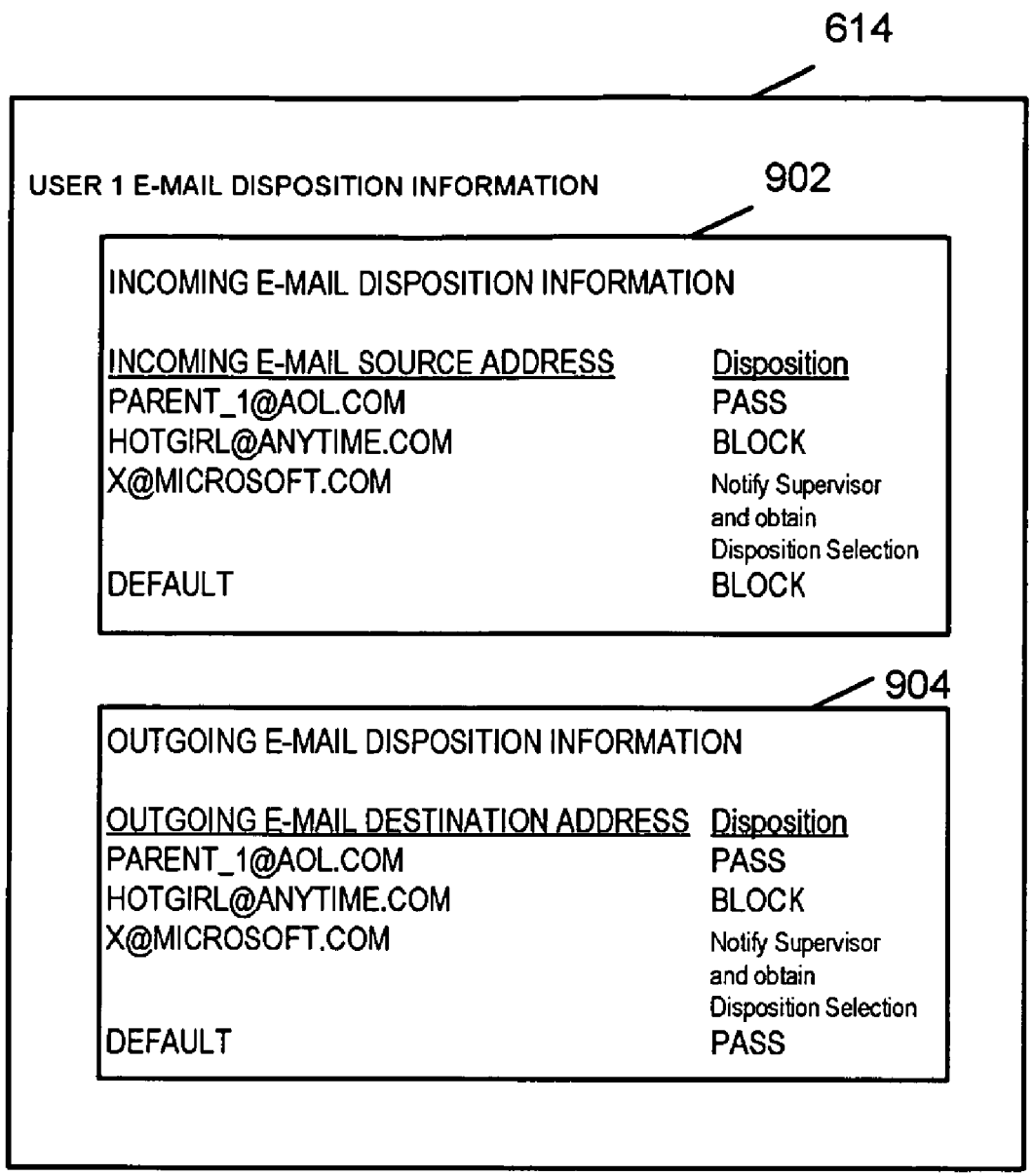
FIG. 9 illustrates a set of E-mail disposition information which may be included in the set of supervisor information shown in FIG. 6.

FIG. 9 a set of E-mail disposition information 614 which may be set up for a supervisor and included in the set of supervisory information 602. The information 614 includes incoming E-mail disposition information 902 and outgoing E-mail disposition information 904. The incoming E-mail disposition information indicates for the listed E-mail addresses, the corresponding disposition action to be taken. The default is set to block incoming E-mails that do not have a source address corresponding to one included in the set of information 902. The outgoing E-mail disposition information 904 indicates for the listed E-mail addresses, the corresponding disposition action to be taken. The default is set to pass outgoing E-mails that do not have a source address corresponding to one included in the set of information 904.

Figure 10:
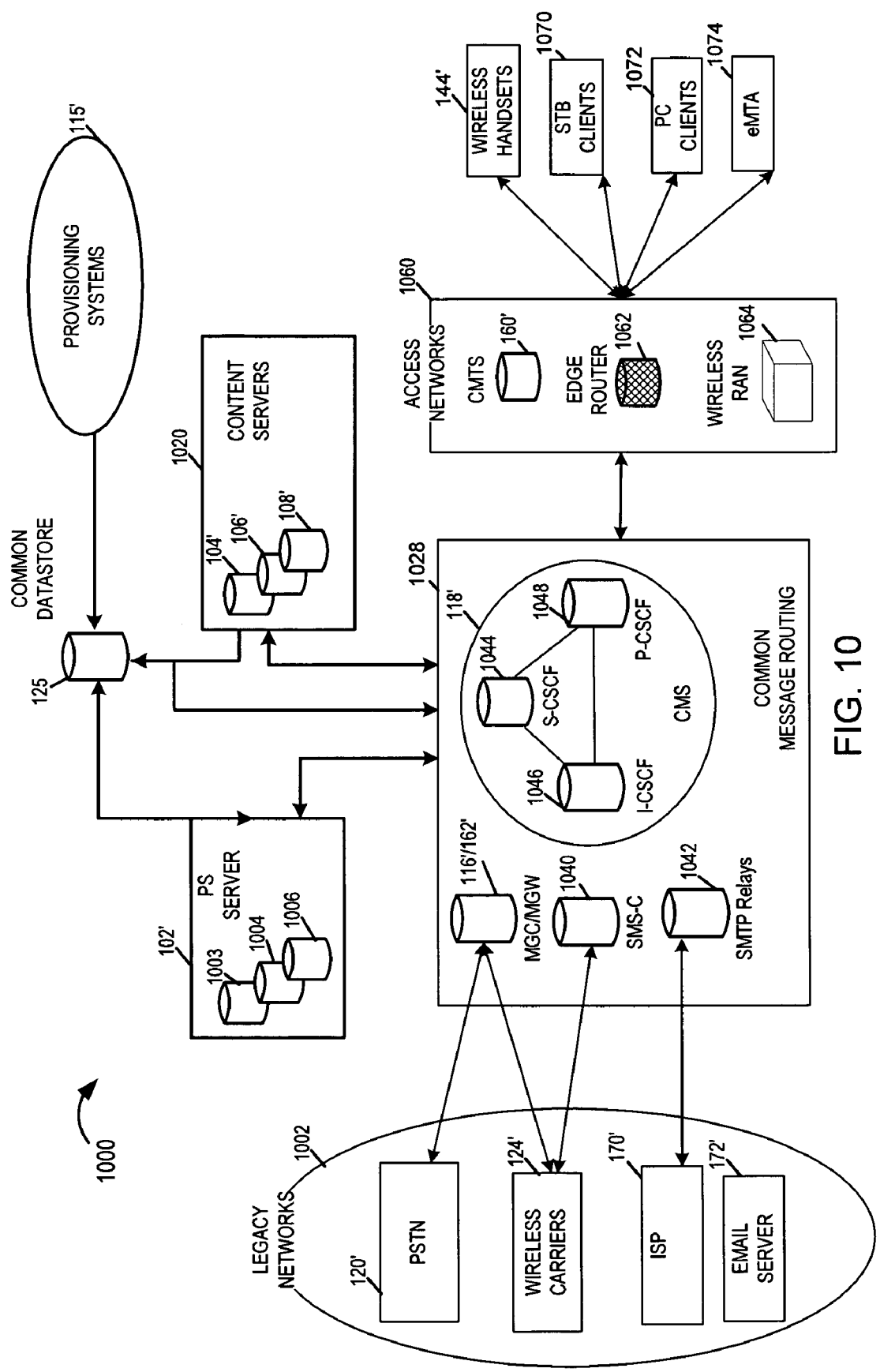
FIG. 10 illustrates a communication system implemented in accordance with the present invention which is capable of implementing the methods and apparatus of the invention.

FIG. 10 illustrates a communication system 1000 implemented in accordance with the present invention which is capable of implementing the methods and apparatus of the invention. The system 1000 is similar to the system 100 shown in FIG. 1. Elements in the system 1000 which are the same as, or similar to elements previously described with regard to the FIG. 1 embodiment are identified using the same reference numbers as used in FIG. 1 but with a prime (') after the number. For example, the PSTN 120 of FIG. 1 may be the same as or similar to the PSTN 120' of the FIG. 10 embodiment. Elements which are the same as or similar to those shown in FIG. 1 will not be discussed again in detail for the sake of brevity.

As shown in FIG. 10, the system 1000 includes a set of legacy networks 1002 which are coupled to a common message routing system 1028 by one or more different types of networks and/or connections. The system 1000 further includes a screening server 102', which enables parental screening of communications. The PS server 102' includes a plurality of applications 1003, 1004, 1006 which work together to screen a variety of different types of communications. The applications 1003, 1004, 1006 may be implemented as computer code stored in memory within the PS server 102' which also includes a processor for executing the applications and an I/O module for receiving and outputting signals, e.g., signals communication information about a communication to the PS server 102' or signals output by the PS server 102' used to control one or more of the other servers and/or devices in the system to perform communications logging, screening and/or disposition operations in accordance with the invention. Screening server 102' is identified as a PS server since it enables parental screening services. However, it should be appreciated that the screening server 102' can be used to support screening of communications to any individual in accordance with the invention. In addition to the PS server 102', the system includes a set 1020 of content servers 104', 106' and 108' which provide content of various types, e.g., as previously discussed with regard to the FIG. 1 embodiment. In the FIG. 10 embodiment, a common data store 125 is used to store information generated by one or more service provisioning systems 115' as well as content used and/or accessed by one or more of the servers 102', 104', 106', 108'. Accordingly common data store 125 may be used to store communication logs and screening information. However, the use of a common data store is not mandatory and the storage of such information may occur at anyone of a plurality of locations in the system 1000 including in the PS server 102'.

The common message routing system 1028 is coupled to the various servers 102', 1020 and, by way of one or more access networks 1060, to end user devices such as wireless handsets 144', Set Top Box clients 1070, PC clients 1072, and a device 1074 including an embedded Media Terminal Adapter. While a variety of different types of access networks can be used, examples of access network devices used to couple the common message routing system 1028 to the various end devices, include a CMTS 160', an edge router 1062 and a wireless router access node 1064.

The common message routing system 1028 may be implemented in a variety of ways with the communications subject to screening triggering notification, logging and/or screening at the server 102 as the communications are received and pass through the common message routing system 1028. In the system 1000, a media gateway controller 116' and/or media gateway in the common message routing system are responsible for notifying the PS server 102' of media communications such as VOD or other content requests and are also responsible for controlling disposition of content in accordance with instructions from the PS server 102' for content related communications subject to screening by the server 102'. The common message routing system 1028 also includes a short message service controller SMS-C for notifying the PS server 102' of SMS messages being communicated and for screening/disposing of such messages under control of the server 102'. IP and/or E-mail communications are processed by one or more SMTP relays 1042 which notify the PS server of communications through the relays and respond to PS server screening and/or disposition instructions. Call processing is supported by a call management system (CMS) 118' which notifies the PS server 102' of calls, implements screening as instructed by the PS server 102' and disposes of calls under direction of the PS server 102' when the calls are subject to screening. The CMS 118' may be implemented using a variety of devices. In the illustrated embodiment the CMS 118' within the common message routing system 1028, includes an Interrogate-Call State Control Function (I-CSCF) server 1046, a Proxy-Call State Control Function (P-CSCF) server 1048 and a Serving-Call State Control Function (S-CSCF) server 1044. In the illustrated embodiment, call processing functionality is divided between the servers 1044, 1046 and 1048. The P-CSCF server 1048 provides functions including security management for the first hop of a call, handles various client protocols and performs other operations related to interacting with end devices used to place or receive IP calls. The S-CSCF 1044 is responsible for handling client registrations and for storing information mapping telephone numbers to IP addresses enabling calls to be routed to an IP device based on the telephone number corresponding to the IP device indicated by stored registration information at a given point in time. The S-CSCF 1044 is responsible for responding to IP address and/or other queries triggered by the Interrogate-CSCF module 1046 which normally seeks such information in response to an attempt to establish a call or in response to a need to route a packet corresponding to a call. The S-CSCF 1044 module notifies the PS server 102' of each query received thereby allowing the PS server 102' to implement a call screening, logging and/or disposition operation at the time a call is established. The S-CSCF 1044 will respond to signals from the PS server 102' and cause call routing and/or logging to be implemented as directed by the server 102'. Thus, in response to a query, the S-CSCF may respond by providing an IP address different from the one in its database corresponding to a telephone number, by indicating that the IP address is not available or taking some other action such as triggering call logging.

In view of the discussion of FIGS. 1 and 10 is should be appreciated that the methods and apparatus of the invention may be implemented in a variety of ways.

In some embodiments different copies, e.g., sets of call, E-mail message and other communication information are maintained in a database for the person whose communications are being monitored/supervised and a copy of the communications for the supervisor. The person whose communications are being monitored is not given access to the supervisor's copies/log but is allowed to delete and/or otherwise edit his or her own copy. For example, assuming the monitored party does not delete any E-mails or SMS text messages, the supervisor's copy of the monitored individuals E-mail and SMS logs (in message box and out message box) will be the same. As the monitored individual deletes messages, E-mails, voice mails, etc. the supervisor's set of the monitored communications and the monitored parties set of communications will differ. By allowing the monitored party to control his own inbox/outbox it give the individual a sense of control and he/she need not know or be advised that the supervisor has maintained a copy of the E-mails and/or other communications. In some embodiments, the supervisor's log is updated to indicate which of the E-mails or other communications still included in the supervisor's copy of the log have been deleted from the monitored individuals log. This can help the supervisor identify E-mails, text messages and/or other communications which the monitored individual or the party with which the monitored individual is communicating is seeking to eliminate from the log and/or hide from the supervisor, e.g., under the assumption that if it is promptly deleted it will not be noticed.

FIGS. 11A and 11B illustrate communications logs generated for a supervisor, e.g., parent, and monitored party, e.g., child 1, in accordance with one exemplary embodiment. Note that the full set of communications received or generated by the children being monitored, e.g., Child 1 and child 2 are shown in the parent log 1102. The status of the communications is also shown, e.g., whether the communication was deleted by the child or not. E-mails deleted by the child are highlighted, e.g., bolded, in some embodiments to draw the parent's attention to the deleted E-mails since these may be ones the child does not want someone else to see, potentially because they reflect activity which would not be considered acceptable to the parent. Note that in the FIG. 11A example, the E-mails which were deleted by the child from BADJOHN@AOL.COM have been highlighted to facilitate the parent's review of the deleted E-mails.

Note that as shown in FIG. 11B, the deleted E-mails do not appear in the child's E-mail log 1104, i.e., the log which the child has access to and sees. Note also that the child's log does not include a log of voice calls or other communications which appear in the more complete parent log. By allowing a monitored child, e.g. child 1, to control the content of his/her own E-mail or other communications log the child is given a sense of control. It is up to the parent, depending on the embodiment, whether or not the child is made aware of the existence and/or independent maintenance of the parental log to which the child does not have access. While the parent may delete items from the parental log, the child can not delete items from the parental log thereby preserving the integrity of the parental review and supervision process.

In some embodiments the parties communicating are informed that the communication may, or is, subject to potential monitoring. This notification may be in the form of a standard line in outgoing E-mails and/or SMS text messages or by sending a reply to incoming text messages and/or E-mails notifying the sending party that the party to whom the communication is being sent has incoming and/or outgoing communications subject to monitoring such as parental screening. For voice calls an audible message warning of actual or potential monitoring of the call may be played before a calling or called party is connected to the individual being monitored.

Figure 12:
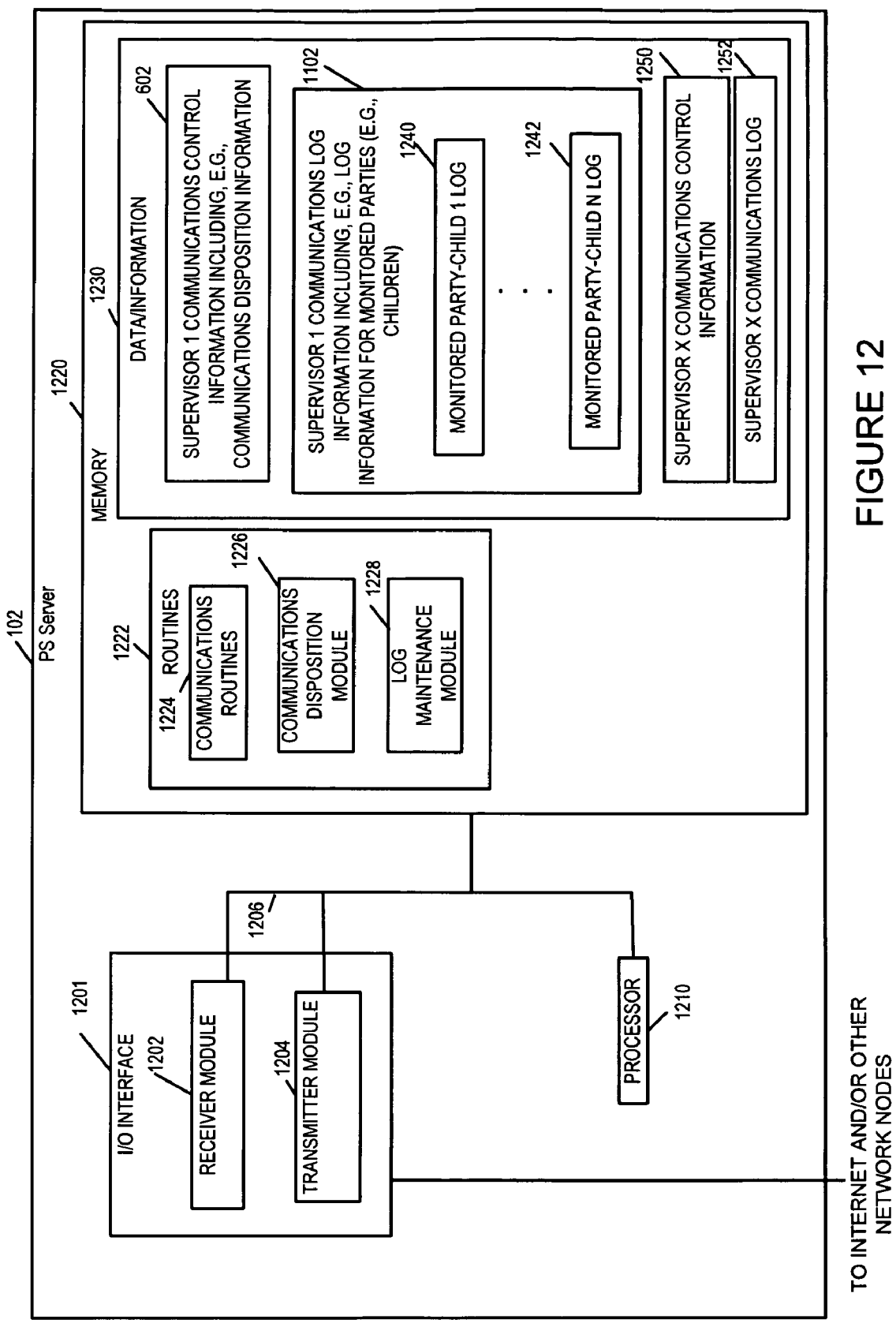
FIG. 12 illustrates an exemplary screening server which may be used as the PS server of FIG. 1 or FIG. 10.

FIG. 12 illustrates an exemplary PS server 102 which may be used as the PS server shown in FIGS. 1 and 10, respectively. As illustrated the PS server includes an I/O interface 1201 coupled to other network nodes and/or the Internet. The interface 1201 includes a receiver module 1202 and a transmitter module 1204 for receiving and sending signals, e.g., data, information and/or commands. The I/O interface 1201 is coupled by a bus 1206 to a memory device 1220 and processor 1210. The memory 1220 may, and in some embodiments is, implemented as a computer readable memory, e.g., RAM, ROM, hard disk or other data storage device. The memory 1220 includes routines 1222 and stored data/information 1230. The routines/modules 1222 which include, in some embodiments, computer (processor) executable instructions which cause the PS Server to implement one or more steps of the invention described in the present application. Included in memory 1220 are communications routines 1224 which control the PS server to receive and send information, instructions, and/or data in accordance with the methods described herein. Communications disposition module 1226 which is also in memory receives and processes communications disposition related information and controls the sending of communications disposition information and instructions to other devices. Log maintenance module 1228 is responsible for receiving information about communications by supervised users, creating and maintaining supervisor logs. Log maintenance module is, in some embodiments, responsible for highlighting, e.g., bolding or flagging, entries in a log which have been deleted by a supervised party. The module 1228 may, and sometimes is, also responsible for limiting log access to a supervisor and preventing access to the supervisor's log by supervised users through implementation of a security measure, e.g., password check or PIN check, prior to allowing access to a supervisor's log. Log maintenance module 1228 allows a supervisor to delete entries from the supervisor's log, e.g., entries corresponding to supervised users, while denying the supervised users the ability to access the supervisor's log.

Data/information stored in the memory 1220 includes supervisor communications control information 602 corresponding to a first supervisor. This information has already been discussed with regard to a previous figure and will not be described again. The data/information also includes, for the first supervisor, a supervisor communications log 1102 which includes logs 1240, 1242 corresponding to first through Nth monitored users, e.g., children. The communications control information and data/information for additional supervisors is also included in the memory 1230 as represented by such information 1250, 1252 for supervisor X.

It should be appreciated that while the E-mail and/or other communications servers may be implemented together with the PS server 102, this is not the case in the FIG. 12 embodiment. Since the E-mail server is not integrated into the PS server, the E-mail logs for the individual monitored users (children) are not shown in FIG. 12, e.g., the E-mail and/or other communications logs for monitored users over which the monitored users have control are not shown in FIG. 12 since they would be stored on the E-mail server or other communication server in the system.

As should be appreciated, a great deal of flexibility in terms of the control and disposition of various communications and constraints on access to the Internet and/or video such as TV can be implemented through the use of a set of supervisor information created in accordance with the invention. Each set of supervisor information may correspond to a different supervisor record. The supervisor records may be accessed based on the source and/or destination of a communication or media session with the source/destination identifier being used to determine which supervisor record should control disposition of the communication or media session.

The techniques of the present invention may be implemented using software, hardware and/or a combination of software and hardware. In the case of software, computer executable instructions used to control a processor may be stored in memory or another storage device and then executed by a processor.

The present invention is directed to apparatus, e.g., communications devices such as telephones, servers, and/or other communications system elements which implement all or a portion of the present invention. It is also directed to methods, e.g., method of controlling and/or operating communication system elements to implement one or more portions of the methods of the invention. The present invention is also directed to machine readable medium, e.g., ROM, RAM, CDs, hard discs, etc., which include machine readable instructions for controlling a machine to implement one or more steps in accordance with the present invention.

In various embodiments system elements described herein are implemented using one or more modules to perform the steps corresponding to one or more methods of the present invention, for example, communication detection, communication disposition, signal processing, message generation and/or transmission steps. Thus, in some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s).

The methods and apparatus of the present invention, are applicable to a wide range of communications systems including elements of one or more communications systems, e.g., cable network systems PTSN systems, cellular systems, etc.

Numerous additional variations of the methods and apparatus of the present invention described above will be apparent to those skilled in the art in view of the above description of the invention. Such variations are to be considered within the scope of the invention. In various embodiments end user communications devices are implemented as notebook computers, personal data assistants (PDAs), or other portable devices including receiver/transmitter circuits and logic and/or routines, for implementing and/or interacting with systems implementing the methods of the present invention.

What is claimed is:

1. A method of providing a supervisor supervisory control over multiple types of communications corresponding to a first user of a communications service, the method comprising:
    storing communications screening information to be used in screening communications corresponding to the first user, said screening information including information used to screen at least two different types of communications; and
    determining, at a network device which is coupled to a communications device corresponding to said first user, based on said stored screening information, how to process a communication directed to said first user or originating from said first user.

2. The method of claim 1, wherein said at least two different types of communications includes at least two of: telephone communications, E-mail communications, video, or text message communications.

3. The method of claim 1, wherein said communications screening information includes information indicating at least one telephone number from which incoming calls are to be blocked and an E-mail address from which incoming E-mail communications are to be blocked.

4. The method of claim 1, wherein said communications screening information includes information indicating communications which are to trigger a communication notification to said supervisor.

5. The method of claim 4, further comprising:
    contacting said supervisor for communication disposition information when a communication is detected for which said communications screening information indicates that said supervisor is to be contacted; and
    receiving at said network device, communication disposition information from said supervisor.

6. The method of claim 5, wherein said step of contacting said supervisor includes providing said supervisor a portion of said communication for which said communications screening information indicates that said supervisor is to be contacted, said portion including at least some text.

7. The method of claim 5, wherein said step of contacting said supervisor includes E-mailing the supervisor for disposition information.

8. The method of claim 1, wherein said step of storing communications screening information includes storing Internet access restriction information indicating first user Internet access restrictions.

9. The method of claim 1, wherein said step of storing communications screening information includes storing TV access restriction information indicating at least one of first user TV channel access restrictions and first user program content restrictions.

10. The method of claim 1, further comprising:
    storing communications screening information to be used in screening communications corresponding to the first user, said screening information including information used to screen at least two different types of outgoing communications which may be sent by said first user.

11. The method of claim 10, wherein said at least two different types of outgoing communications includes at least two of: telephone communications, E-mail communications, video communications, and text message communications.

12. The method of claim 1, further comprising:
    creating a supervisor log including log information for communications corresponding to each of a plurality of supervised users, said first user being one of said plurality of supervised users.

13. A method of providing a supervisor supervisory control over multiple types of communications corresponding to a first user of a communications service, the method comprising:
    storing communications screening information to be used in screening communications corresponding to the first user, said screening information including information used to screen at least two different types of communications; and
    determining, based on said stored screening information, how to process a communication directed to said first user or originating from said first user;
    creating a supervisor log including log information for communications corresponding to each of a plurality of supervised users, said first user being one of said plurality of supervised users; and
    updating said supervisor log to highlight communications deleted by said first user from a user communications log over which said first user has control.

14. The method of claim 13, wherein said supervisor log is maintained on a separate system from a system on which the user communications log is maintained, the method further comprising:
    providing the supervisor control over said supervisor log while restricting the supervised users from obtaining access to said supervisor log, supervisor control including the ability to delete entries from said supervisor log.

15. The method of claim 13, wherein said supervisor log is separate from said user communications log.

16. A communications system including:
    a network device coupled to a communications device corresponding to a monitored party;
    means for detecting any one of a plurality of different types of incoming or outgoing communications corresponding to a monitored party;
    means for notifying a monitoring party of a detected communication detected by said means for detecting, the detected communication corresponding to the monitored party, said communication being any one of an SMS text message, a telephone call, or an E-mail; and
    means for allowing the monitoring party to control the disposition of the detected communication.

17. A communications system including:
    means for detecting any one of a plurality of different types of incoming or outgoing communications corresponding to a monitored party;
    means for notifying a monitoring party of a detected communication detected by said means for detecting, the detected communication corresponding to the monitored party, said communication being any one of an SMS text message, a telephone call, or an E-mail; and
    means for allowing the monitoring party to control the disposition of the detected communication;
    a stored communication log of communications corresponding to a monitored party which is under the control of the monitored party; and
    a duplicative communication log corresponding to a monitored party which is under the control of the monitoring party.

18. The system of claim 17, wherein deletion of a communication from the stored communication log which is under the control of the monitored party does not result in deletion of a copy of the communication in the duplicative communication log which is under the control of the monitoring party.

19. A communications system including:
- a detection module for detecting any one of a plurality of different types of incoming or outgoing communications corresponding to a monitored party;
- a message generation module for generating a message notifying a monitoring party of a detected communication detected by said detection module, the detected communication corresponding to the monitored party, said communication being any one of an SMS text message, a telephone call, or an E-mail;
- a stored communication log of communications corresponding to a monitored party which is under the control of the monitored party; and
- a duplicative communication log corresponding to a monitored party which is under the control of the monitoring party.

20. The system of claim 19, wherein deletion of a communication from the stored communication log which is under the control of the monitored party does not result in deletion of a copy of the communication in the duplicative communication log which is under the control of the monitoring party.

* * * * *